United States Patent [19]

Utsugi

[11] Patent Number: 4,613,910
[45] Date of Patent: Sep. 23, 1986

[54] STILL PICTURE TO TELEVISION SIGNAL CONVERSION SYSTEM

[75] Inventor: Mikio Utsugi, Tokyo, Japan

[73] Assignee: Fuji Photo Film Co., Ltd., Kanagawa, Japan

[21] Appl. No.: 494,896

[22] Filed: May 16, 1983

[30] Foreign Application Priority Data

Jun. 2, 1982 [JP] Japan .................. 57-94391

[51] Int. Cl.[4] .................. H04N 5/782; H04N 5/781
[52] U.S. Cl. .................. 358/310; 358/54; 358/906; 358/335; 358/342; 358/334; 360/35.1
[58] Field of Search .............. 358/332, 334, 335, 199, 358/214, 54, 312, 342, 906; 360/9.1, 10.1, 10.2, 10.3, 35.1

[56] References Cited

U.S. PATENT DOCUMENTS

| 3,524,012 | 8/1970 | Kihara | 358/312 |
| 3,999,218 | 12/1976 | Iyama et al. | 360/35.1 |
| 4,058,840 | 11/1977 | Kasprzak | 360/10 |
| 4,471,388 | 9/1984 | Dischert | 358/906 |
| 4,475,130 | 10/1984 | Miller et al. | 358/335 |

Primary Examiner—Robert L. Richardson

Attorney, Agent, or Firm—Birch, Stewart, Kolasch & Birch

[57] ABSTRACT

A still picture to television signal conversion system for scanning a still picture to produce a video signal includes an image pickup device for scanning a still picture to form a video signal, which represents the still picture. A rotatable recording medium is caused by a drive unit to rotate. A recording unit is operatively connected to the image pickup device to record the video signal on the recording medium. A reproducing unit reads the video signal out of the recording medium for playback. A control circuit is constructed to enable the drive unit to rotate the recording medium at a first speed, cause the image pickup device to scan the still picture in synchronism with the rotation of the recording medium, and cause the recording unit to record the video signal on a predetermined recording unit of the recording medium. The control circuit is also constructed to cause the drive unit to rotate the recording medium at a second speed, and cause the reproducing unit to repeatedly reproduce the video signal which is stored in the recording unit and represents one still picture.

5 Claims, 4 Drawing Figures

STILL PICTURE TO TELEVISION SIGNAL CONVERSION SYSTEM

BACKGROUND OF THE INVENTION

1. Field of the Invention

The present invention relates to a system for converting a still picture into television signals.

2. Description of the Prior Art

A slide, photographic print or like information bearing medium with a still picture recorded thereon may be processed to pick up a television (TV) signal thereoutof by, for example, the optical scanning system which is disclosed in U.S. Pat. No. 4,306,252. In this prior art system, a scanning mirror is mechanically caused into a reciprocal pivotal movement to vertically scan a still picture, while a one-dimensional solid-state image pickup device (linear image sensor) scans it horizontally by means of electronics, thereby scanning an entire still picture in a raster fashion. To output a video signal in a TV signal format, the mirror is angularly displaced by mechanical means at a playback rate of video signals. Concerning one-frame two-field interlace scanning as in the NTSC standard television system, the mirror is caused to swing at the rate of 60 fields per second for vertical scans. While driving the mirror in a reciprocal movement at the scanning speed, the system switches the optical path and reverses the scanning direction upon every vertical scan so as to prevent fast returns of the mirror during blanking periods. For so switching the optical path, however, the system has to rely on intricate optical and mechanical arrangements including a disc which has reflecting and transmitting portions and rotates in unison with the scanning mirror.

Also known in the art is a method in which a mechanical scanning arrangement is used to scan a still picture to form a video signal at a rate slower than an expected rate of the video signal on reproduction of the image. This method, to output a video signal as a TV signal, once stores the video signal formed by the slow scans in a storage which is installed in a video signal processing apparatus and, then, reads it out at the reproduction rate. Such a method cannot be practiced unless the video signal is processed in the form of digital signals. Another drawback is that the use of such a storage is undesirable from the economical standpoint in view of the numerous bits in one frame of image data and the frequent demand for storing numerous frames.

SUMMARY OF THE INVENTION

It is therefore an object of the present invention to provide a still picture to television signal conversion system which is relatively simple in construction and excellent in economy.

In order to achieve this object, the present invention provides a still picture to television signal conversion system for scanning a still picture to produce a video signal, which includes image pickup means for scanning a still picture to form a video signal representing the still picture. A rotatable recording medium is driven by drive means to rotate. Recording means is operatively connected to the image pickup means so as to record the video signal on the recording medium. Reproducing means reads the video signal out of the recording medium to reproduce the video signal. A control circuit is constructed to actuate the drive means to cause the recording medium to rotate at a first speed, to cause the image pickup means to scan the still picture in synchronism with the rotation of the recording medium, and to cause the recording means to record the video signal in a predetermined recording unit of the recording medium. The control circuit is also constructed to enable the drive means to rotate the recording medium at a second speed, and cause the reproducing means to repeatedly reproduce the video signal which is stored in the recording medium and which represents one still picture.

BRIEF DESCRIPTION OF THE DRAWINGS

The objects and features of the present invention will become more apparent from a consideration of the following detailed description taken in conjunction with the accompanying drawings in which:

FIG. 3 is a plan view of a cam included in the arrangement of FIG. 1; and

FIG. 4 shows an alternative example of a cam which may be applicable to the arrangement shown in FIG. 1.

DESCRIPTION OF THE PREFERRED EMBODIMENT

Figure 1:
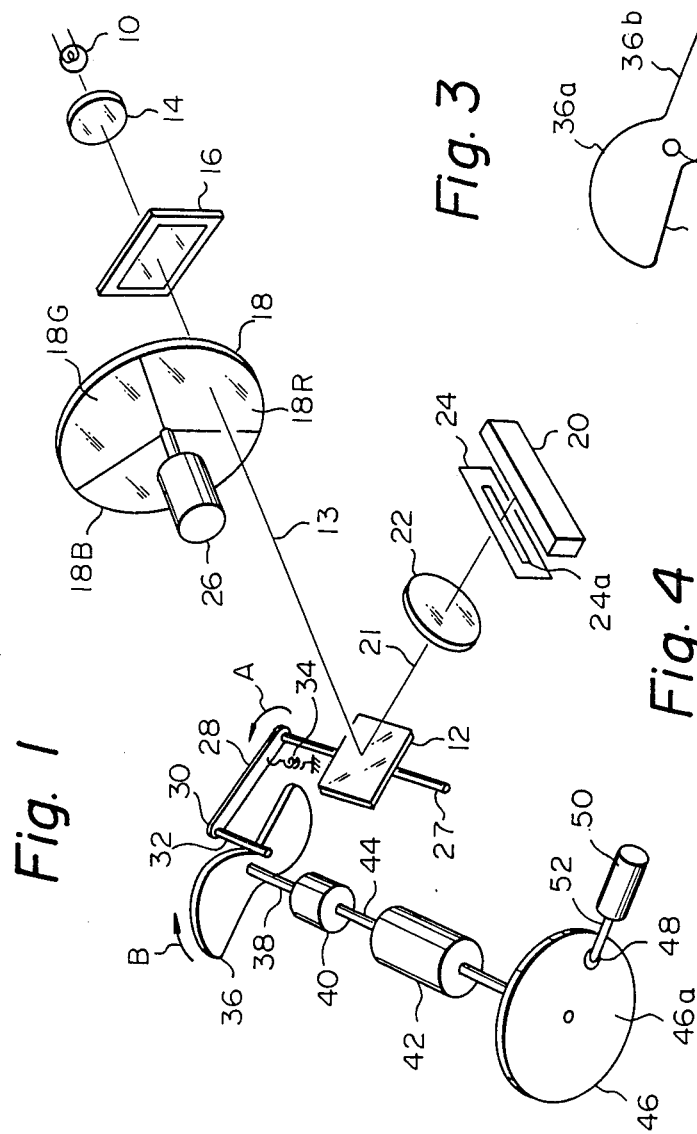
FIG. 1 is a schematic perspective view of an optomechanical arrangement of a still picture to television signal conversion system in accordance with the present invention.
Figure 2:
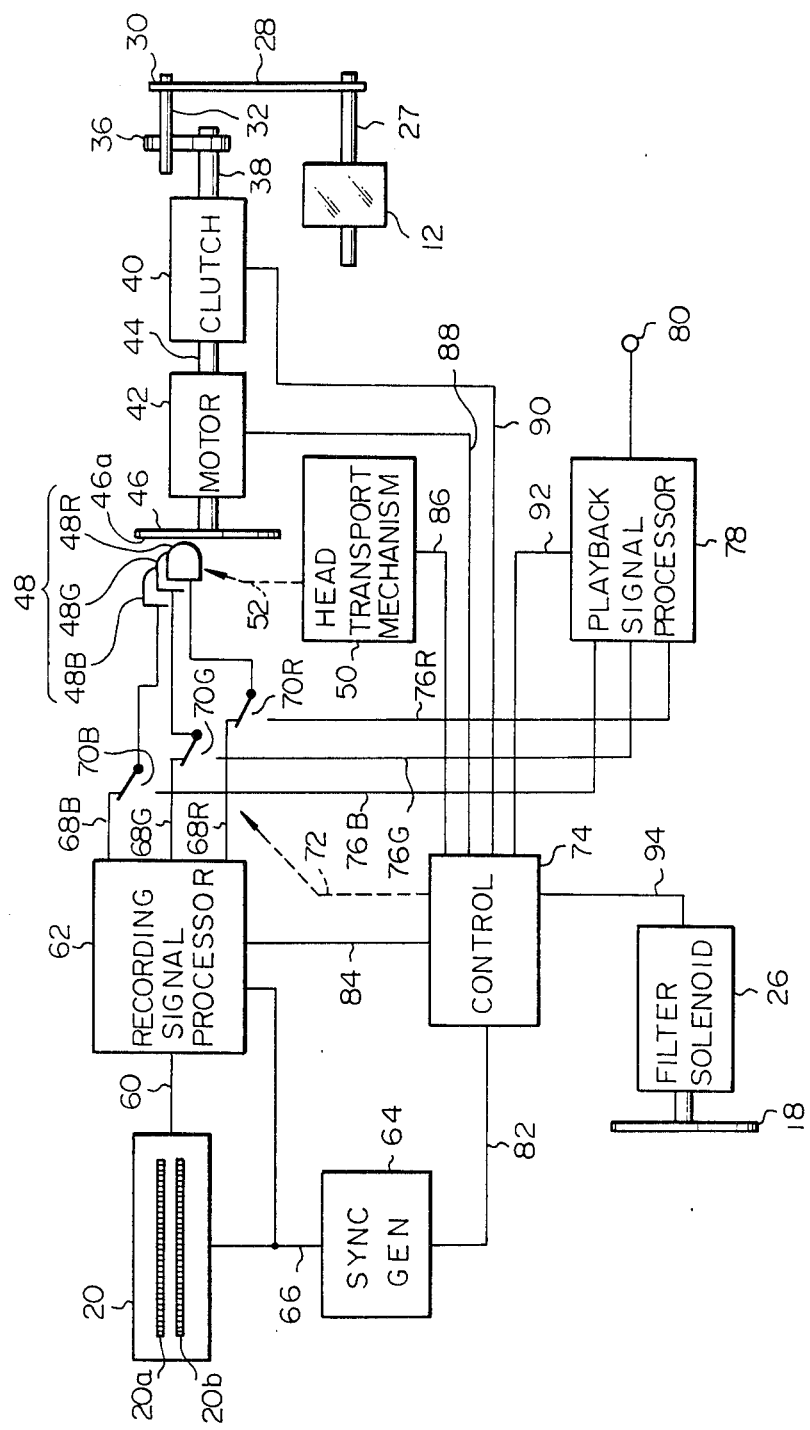
FIG. 2 is a schematic block diagram showing electric circuitry associated with the arrangement shown in FIG. 1.

The still picture to television signal conversion system in accordance with the present invention generally comprises an optomechanical arrangement as shown in FIG. 1 and an electrical arrangement as shown in FIG. 2. In FIGS. 1 and 2, the same reference numerals designate the same structural elements.

Referring to FIG. 1, the optomechanical arrangement includes a light source 10 and a mirror 12 between which extends an optical axis 13. Arranged in sequence on the optical axis 13 are a condensing lens 14, an information bearing medium (represented by a slide hereinafter) 16 with a still picture recorded thereon, and a color filter 18. The mirror 12 deflects the optical axis 13 into a second optical axis 21 which terminates at a solid-state image pickup device 20. A scan lens 22 and a slitted member 24 are located on the optical axis 21.

The color filter 18 comprises a rotatable transparent disc which is, for example, trisected into segments or sectors 18R, 18G and 18B colored in red (R), green (G) and blue (B) respectively. A solenoid 26 is operated to rotate the filter 18 by every ⅓ rotation, i.e. 120°, until a desired filter segment 18R, 18G or 18B becomes located on the optical axis 13.

Preferably, the solid-state image pickup device 20 comprises a charge coupled device or the like, which may advantageously have, in the case of a one-frame two-field interlace scanning system, two one-dimensional (linear) image sensing arrays 20$a$ and 20$b$ (see FIG. 2). The image pickup device 20 is adapted to scan the picture on the slide 16 in the horizontal (H) direction. The member 24 is formed with a slit 24$a$ which is associated with one horizontal scan line and is oriented in the same manner as the sensor arrays 20$a$ and 20$b$ of the device 20. The scan lens 22 focuses the projected and reflected image of the slide 16 onto the image pickup surface or photosensitive arrays of the device 20. Where use is made of an image pickup device having a single image sensing array, the output will be switched for the second or even field of an interlace scan such that an image signal is output from the center of the sensor array.

The mirror 12 for deflecting the optical path is rigidly mounted on a rotatable shaft 27. An arm 28 is rigidly connected at one end to the shaft 27 while carrying a cam follower 32 at the other or free end 30 thereof. The arm 28 is constantly biased in a direction indicated by an arrow A as by a spring 34 one end of which is retained by a rigid member of the system.

A cam 36 is mounted on a rotatable shaft 38 which is parallel to the shaft 27. The cam follower 32 is biased by the spring 34 into contact with the contour of the cam 36. The shaft 38 is operatively connected to an output shaft 44 of a motor 42 through a clutch 40. A preferred example of the motor 42 may be a stepping motor.

The profile of the cam 36, as shown in FIG. 3, comprises a pair of spiral edges 36a and a pair of inclined edges 36b. When the motor 42 is driven to move the cam 36 as indicated by an arrow B while the cam follower 32 is in contact with a spiral edge 36a, the cam follower 32 and hence the arm 28 are moved clockwise about the shaft 27 against the action of the spring 34 and at a relatively lower speed. As the cam 36 is further moved in the direction B until the cam follower 32 becomes engaged with the adjacent inclined edge 36b, the cam follower 32 and thereby the arm 28 are rotated counterclockwise, in the direction A, about the shaft 27 by the action of the spring 34 and, this time, at a relatively higher speed. As a result, the mirror 12 swings about the shaft 27 at a relatively lower constant speed in the clockwise direction and at a relatively higher constant speed in the counterclockwise direction. This excursion is repeated for each half rotation of the cam 36. The optical axis of the mirror 12, therefore, will be swept twice per rotation of the cam 36 thereby scanning the slide 16 twice in the vertical (V) direction. In this manner, the system of the present invention is capable of performing raster scans over the entire surface of the slide 16 due to the horizontal scans by the image pickup device 20 and the vertical scans by the mirror 12. As shown in FIG. 3, each edge 36b of the cam 36 is inclined by a certain angle with respect to a radius of the cam 36 which emerges from the shaft 38. This angle will permit the mirror 12 to regain its initial or vertical scan start position, sufficiently utilizing the blanking period, so that the mirror 12 despite its certain inertia can smoothly swing without oscillation.

The output shaft 44 of the motor 42 carries at the other end a detachable rotary recording medium 46 in the form of a disc, which may preferably be a magnetic or optical recording disc. The following description will concentrate on the use of a magnetic disc for convenience. In this embodiment, the magnetic disc 46 has a number of tracks thereon to be capable of recording a number of still pictures.

A magnetic record/playback head or transducer 48 is positioned above a recording surface or surfaces 46a of the disc 46 and is supported by an arm 52 of a head transport mechanism 50. The head transport mechanism 50 is controllable to move the head 48 to a position above a desired track on the disc 46, so that data may be written into or read out of the track as the disc 46 is driven by the motor 42. In case of the use of an optical disc, the magnetic head 48 will be replaced by a laser, an acoustoptical modulator and a photosensor.

Referring to FIG. 2, the image pickup device 20 has an image signal output 60 which is connected to a recording signal processing circuit 62. Both the image pickup device 20 and signal processor 62 are clocked with a synchronous generator 64 via a lead 66. Processing the image signal on the line 60, the signal processor 62 transforms it into field-by-field TV signals to deliver the red video signal to an output 68R, green video signal to an output 68G and blue video signal to an output 68B. These outputs 68R, 68G and 68B are respectively connected to magnetic head 48R, 48G and 48B via transfer contacts 70R, 70G and 70B.

It will be seen from the above that the magnetic head 48 is an assembly of the head 48R for a red video signal, head 48G for a green video signal and head 48B for a blue video signal, which are integrally supported by the arm 52 of the head transport mechanism 50. While the heads 48R, 48G and 48B are individually furnished with recording and playback functions, separate heads may be employed to attain the two functions individually.

Preferably, the transfer contacts 70R, 70G and 70B comprise analog switches. A control circuit 74 controls the contacts 70R, 70G and 70B as symbolically indicated by a phantom line 72, actuating all of them at the same time. The other terminals 76R, 76G and 76B of the contacts 70R, 70G and 70B are commonly connected to a playback signal processing circuit 78. Video signals read out of the disc 46 by the head 48 will be amplified, demodulated and fed to an output 80 as a TV signal by the playback signal processor 78.

The control circuit 74 is clocked with the sync generator 64 via a lead 82 to totally control the operation of the system, and may comprise a microprocessor or like device. Control outputs of the control circuit 74 are fed to the recording signal processor 62, head transport mechanism 50, motor 42, clutch 40, playback signal processor 78 and filter solenoid 26 over control lines 84, 86, 88, 90, 92 and 94 respectively. The control effected over the system by the control circuit 74 will be described hereinafter.

First, a procedure for recording a still picture on the slide 16 into the disc 46, i.e., a record mode operation will be discussed. In this particular embodiment, two fields (one frame) of data are recorded on a single track of the disc 46 on the one-frame two-field interlace scan basis, and, therefore, three tracks on the disc 46 will be used for recording one frame of color image by the three-color, field sequential system. Alternatively, one field of data may be recorded on one track (i.e. one frame of data on two tracks) in which case the cam profile shown in FIG. 3 is replaced by one which has a single spiral edge and a single inclined edge, as depicted in FIG. 4.

In the record mode operation, the control 74 coupled the clutch 40 and supplies the motor 42 with a sequence of pulses to drive it at a lower speed. A preferable rotation speed of the cam 36 may be ten to several hundreds rpm. At the same time, the control 74 actuates the head transport mechanism 50 to select or seek an idle track on the disc 46 to locate the head 48 above the selected track. During each half rotation of the cam 36 caused by the motor 42, the mirror 12 swings as previously mentioned to sweep the imaging optical axis which is incident on the image pickup device 20, thereby vertically scanning the picture on the slide 16. In the meantime, the device 20 is clocked with the sync generator 64 to perform one field of horizontal scan (e.g. 262.5 horizontal scan lines in the NTSC standard television system). Then, the sensor array 20a, for example, delivers a time-serial video signal to the recording signal processor 62.

In the record mode operation, the control 74 maintains the change-over contacts 70R, 70G and 70B in connection with the terminals 68R, 68G and 68B respectively. Supposing that the red segment 18R of the filter 18 is on the optical axis 13 by way of example, the sensor array 20a picks up a red video signal of the first or odd field through the red filter segment 18R, so that this signal is delivered by the signal processor 62 to the signal line 68R. The signal is fed to the head 48R via the contact 70R so that the head 48R writes the signal into the former half of the first track on the disc 46.

In response to the other half of the rotation of the cam 36, the mirror 12 performs another excursion and, for that while, the video signal is delivered from the other sensor array 20b to the output 60 clocked with the sync generator 64. This video signal contains 262.5 scan lines of the second field and the uppermost scan line in this field starts to be scanned at its center. In this manner, the red video signal of the second field is written into the latter half of the first track by way of the signal processor 62, signal line 68R, contact 70R and head 48R. Where the arrangement is to sequentially record one field of data on a single track, the head 48R will be shifted to the next track to record the second field of red data thereon.

The control 74 now controls the mechanism 50 to move the head 48 such that, for example, the green head 48G becomes located above the next track to begin writing a green video signal into the selected track. The control 74 energizes the filter solenoid 26 to angularly move the filter 18 over a ⅓ rotation, positioning the green segment 18G on the optical axis 13. Under this condition, the green video signals in the first and second fields will be sequentially written into the former and latter halves of the second track on the disc 46 in the same manner as those of the red video signal. Finally, the control 74 locates the blue filter segment 18B on the optical axis 13 to then write the first and second fields of the blue video signal into the former and latter halves of the third track on the disc 46 by the same principle as employed for the red and green video signals.

In the playback mode operation, on the other hand, the control 74 uncouples the clutch 40 and supplies the motor 42 with a pulse train higher in frequency than the pulse train for the write mode operation on the control line 88, thereby driving the motor 42 at a higher speed. The rotation speed of the motor 42 may be 1,800 rpm for one-track two-field recording system, and 3,600 rpm for the one-track one-field recording system. Here, the cam 36 will not rotate because the clutch 40 has been uncoupled. This has the effect of preventing the mirror 12 from rapidly reciprocating between the two positions despite the higher speed rotation of the motor 42; the mirror 12 would otherwise damage the system. The control 74 in the read mode operation switches the contacts 70R, 70G and 70B into connection with the terminals 76R, 76G and 76B respectively.

In the above situation, the control 74 actuates the head transport mechanism 50 to select three tracks on the disc 46 which store a desired frame (still picture) and, then locates the red head 48R, green head 48G and blue head 48B above the se three tracks respectively. As the control 74 enables the signal processor 78, the latter reads out the red, green and blue video signals at a time out of the three tracks of the disc 46 by the heads 48R, 48G and 48B. The video signals of such different colors are organized by the signal processor 78 into, for example, an NSTC standard compatible TV signal. The TV signal is delivered from the processor 78 to the output 80. In the event one track on the disc 46 stores two fields of video signals, the signals of the first and second fields associated with the respective colors will be sequentially read out during one full rotation of the disc 46. Because the disc 46 rotates at a constant speed of 1,800 rpm, the TV signal representing one still picture on the slide 16 will be developed on the output 80 at the frame rate of 40 frames per second.

In summary, it will be seen that the still picture to TV signal conversion system of the present invention is successful to process a still picture into a TV signal using a large capacity rotary recording medium of relatively low cost, instead of the conventional costly storage device. A mechanical linkage insures synchronous operations for writing data into the recording medium and scanning a still picture. The scanning mechanism is simple in construction and low in operating speed, which precludes mechanical overloading, thereby enhancing the reliability of operation. Further, such a recording medium can accommodate a number of frames of still pictures and store them over a long period of time.

Various modifications will become possible for those skilled in the art after receiving the teachings of the present disclosure without departing from the scope thereof. For example, the color filter 18 may be driven by the motor 42 employed for the cam 36 and disc 46, instead of the solenoid 26. In such a case, supposing the field sequential system described, the rotation speed of the motor 42 may be reduced to ⅓ by a reduction mechanism before transmitted to the drive of filter 18, so that the color of the filter on the optical axis 13 changes from one to another every time two fields are scanned. If desired, the field sequential system may be substituted by the line sequential system. While magnetic heads have been allocated in one-to-one correspondence with the three colors, use may be made of a single magnetic head which is movable from one track to another each time data in each color is recorded.

What is claimed is:

1. A still picture to television signal conversion system for scanning a still picture to produce a video signal representative of the still picture, comprising:
   image pickup means for scanning a still picture to form a video signal representative of the still picture;
   a rotatable recording medium;
   drive means for causing said recording medium to rotate;
   said image pickup means including an image pickup device for scanning the still picture horizontally to form the video signal, and a vertical scanning mechanism for sweeping an optical beam impinging from the still picture on said image pickup device in the vertical direction of the still picture in synchronism with said drive means;
   recording means connected to said image pickup means for recording the video signal on said recording medium;
   reproducing means for reading the video signal out of said recording medium to reproduce the video signal; and
   control circuit means for controlling said drive means to rotate said recording medium at a first speed, causing said image pickup means to scan the still picture in synchronism with the rotation of said recording medium, and causing said recording means to record the video signal on a predetermined recording unit of said recording medium;

said vertical scanning mechanism including separating means for separating in synchronization said vertical scanning mechanism from said drive means to stop the sweeping under the control of said control circuit;

said control circuit means controlling said separating means to stop the sweeping operation of said vertical scanning mechanism, further controlling said drive means to rotate said recording medium at a second speed, and causing said reproducing means to repeatedly reproduce the video signal which is stored in said recording means and represents one still picture;

the first speed being sufficiently lower than the second speed, with said second speed being in conformity with television signals.

2. A system in accordance with claim 1, in which the recording medium comprises a magnetic disc which accommodates in one recording track thereof at least one field of video signal.

3. A system in accordance with claim 2, in which the vertical scanning mechanism performs sweeping twice for one rotation of the disc caused by the drive means, the control circuit effecting interlace scanning by the image pickup device so that two fields of video signals are recorded on one recording track on the magnetic disc.

4. A system in accordance with claim 2, in which the image pickup means includes a separate-color filter for imaging separated colors in a field sequential system, the recording means recording a video signal of one color on one recording track.

5. A system in accordance with claim 4, in which the reproducing means includes a plurality of magnetic heads in one-to-one correspondence with the separate colors, said magnetic heads sensing video signals of the respective colors of one still picture at a time out of the recording tracks which are associated with the respective colors.

* * * * *